(12) United States Patent
Kuhlke et al.

(10) Patent No.: US 7,814,151 B2
(45) Date of Patent: Oct. 12, 2010

(54) WIRELESSLY-ENABLED IDENTIFICATION OF DIGITAL MEDIA GENERATED AT AN EVENT

(75) Inventors: Matthew Kuhlke, San Francisco, CA (US); Fadi R. Jabbour, Berkley, CA (US); Eric H. Lee, Cerritos, CA (US); David C. Lee, Sunnyvale, CA (US); Michael A. Ramalho, Sarasota, FL (US)

(73) Assignee: Cisco Technology, Inc., San Jose, CA (US)

( * ) Notice: Subject to any disclaimer, the term of this patent is extended or adjusted under 35 U.S.C. 154(b) by 216 days.

(21) Appl. No.: 11/977,033

(22) Filed: Oct. 23, 2007

(65) Prior Publication Data

US 2009/0106362 A1    Apr. 23, 2009

(51) Int. Cl.
*G06F 15/16* (2006.01)
(52) U.S. Cl. .................... 709/204; 709/227; 348/207.1; 348/211.1
(58) Field of Classification Search ................ 709/204, 709/20, 227, 249; 725/86–104, 105, 135–142, 725/143–153; 715/234, 733–759; 348/207.1, 348/211.1, 571; 370/338, 260
See application file for complete search history.

(56) References Cited

U.S. PATENT DOCUMENTS

| | | | | |
|---|---|---|---|---|
| 6,829,487 | B2* | 12/2004 | Eiden et al. | 455/519 |
| 7,266,383 | B2* | 9/2007 | Anderson | 455/518 |
| 2003/0236890 | A1* | 12/2003 | Hurwitz et al. | 709/227 |
| 2006/0055804 | A1* | 3/2006 | Arai et al. | 348/333.01 |
| 2006/0174206 | A1* | 8/2006 | Jung et al. | 715/751 |
| 2007/0016575 | A1* | 1/2007 | Hurst-Hiller et al. | 707/5 |

* cited by examiner

*Primary Examiner*—Wing F Chan
*Assistant Examiner*—Ruolei Zong
(74) *Attorney, Agent, or Firm*—The Law Offices of Bradley J. Beresnak

(57) ABSTRACT

A method in one embodiment includes embedding a unique event tag into media files recorded at an event by a first media recording device, which is operable to wirelessly discover a second media recording device at the event. The first media recording device wirelessly communicates the unique event tag to the second media recording device for embedding into media files recorded at the event by the second media recording device. It is emphasized that this abstract is provided to comply with the rules requiring an abstract that will allow a searcher or other reader to quickly ascertain the subject matter of the technical disclosure.

13 Claims, 5 Drawing Sheets

WIRELESSLY-ENABLED IDENTIFICATION OF DIGITAL MEDIA GENERATED AT AN EVENT

FIELD OF THE INVENTION

The present disclosure relates generally to the fields of wireless communication and sharing of digital media files.

BACKGROUND OF THE INVENTION

Many modern digital media recording devices are configured to encode or embed information such as date & time, focus position, device make and model, etc., directly into the recorded media. Recording of information associated with a media file is commonly referred to as "tagging". Tagging of music and other digital media files to help in organizing media for playback on a portable media device is increasingly popular. For example, a music tagging freeware program called TigoTago™ provides a user with fast access to all of the tags in a file by displaying them in an editor similar to a spreadsheet. This allows the user to set and modify tags and to rename a huge number of digital music files.

At any given event (large or small scale) there may exist multiple individuals recording digital media, e.g., taking digital photographs, moving picture videos, and/or audio recordings with their respective devices. Using existing media-sharing technologies it is often time-consuming for two or more individuals to share their recorded media files of the event at a later date. For instance, in order to share their media files each individual usually needs to know the other person's specific contact information, where the media is stored on a mutually accessible device, specific tags attached to or recorded in the media, etc. This makes sharing of media files recorded from a given event a cumbersome task.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

Figure 1:
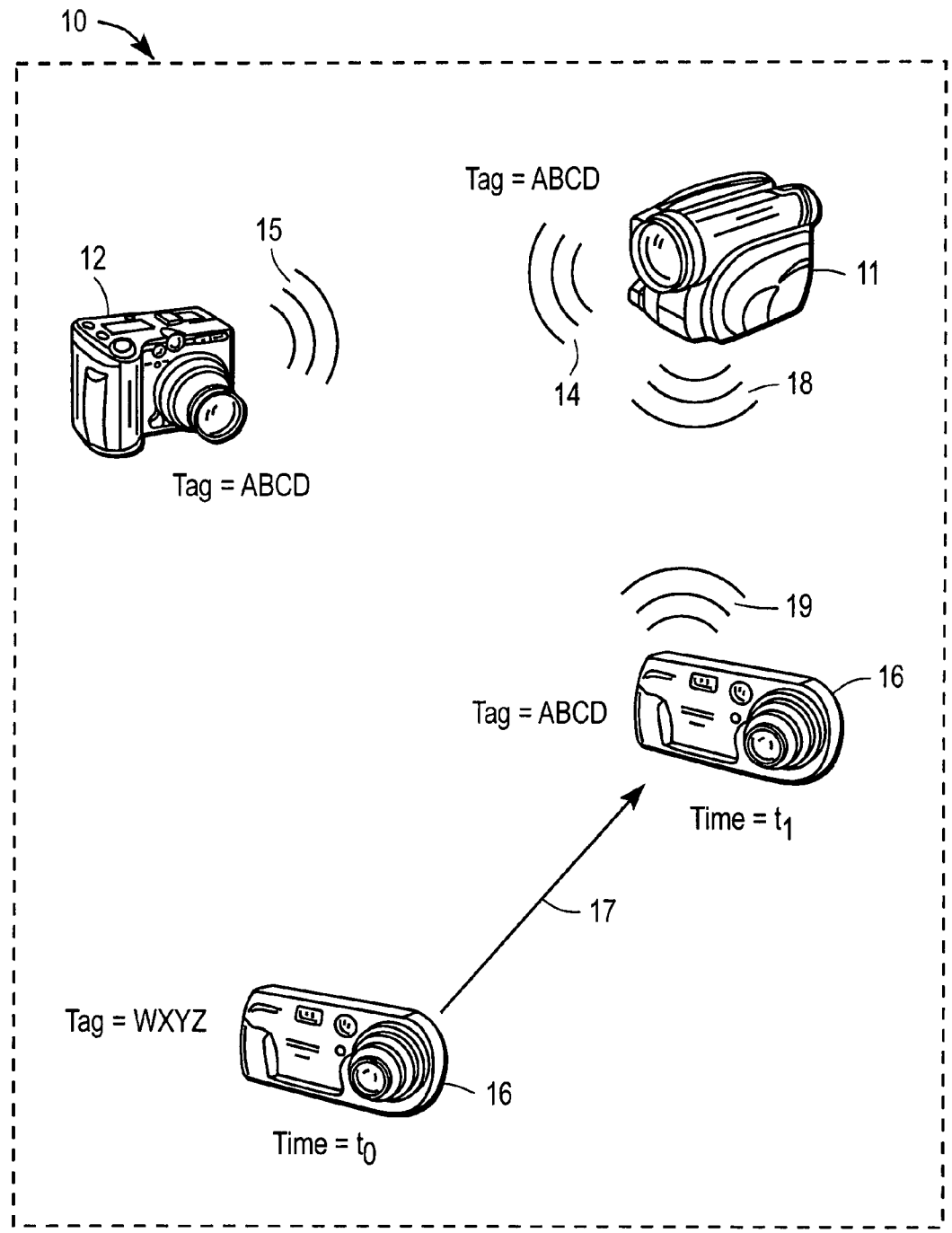
FIG. 1 illustrates an example event with wireless communication and updating of tags for media files created by different digital recording devices.

According to one embodiment of the present invention, digital media recording devices associated with users who are attending an event are configured to automatically embed a unique tag into the recorded media. The unique tag identifies the recorded media (audio, visual, or A/V) as having been taken (i.e., recorded) as part of the given event. The event-unique tag can be used to allow any media posted on the Internet to be automatically indexed as taken at that specific event. Other users who wish find media recorded at the event are able to easily locate all relevant media on the Internet with a simple query.

In one embodiment, the media recorders are configured to wirelessly detect other digital media recording devices (e.g., cameras, DVRs, etc.) within the transmission range or specified proximity. The devices may exchange messages resulting in each device agreeing to encode images, sound clips, and/or videos taken during the event with a tag or identifier unique to the event. This identifier allows for photos or videos to be easily shared following the event. Media recording devices that have already recorded media at the event, and which subsequently link up through wireless message exchanges with another device may adopt the unique event identifier in use among a majority of the devices so that, over time, all of the devices present at the event end up using the same tag or identifier. Tags or identifiers used for earlier recorded media files are updated or changed to reflect the commonly used event identifier.

A variety of different media-sharing paradigms may be utilized. By way of example, all users who attended the event may upload their recorded media to a pre-determined central repository or Internet-based location. At a later date individuals can check the location for available media that has been deposited for sharing purposes. Another possibility is to disseminate among the attendees the contact information of all those present at the event. At a later date or time, individuals can coordinate exchange of the recorded media. For instance, this exchange can take place via removable media (e.g., CD, Memory Card, etc.) or over the internet.

DESCRIPTION OF EXAMPLE EMBODIMENTS

In the following description specific details are set forth, such as device types, system configurations, protocols, methods, etc., in order to provide a thorough understanding of the disclosure herein. However, persons having ordinary skill in the relevant arts will appreciate that these specific details may not be needed to practice the embodiments described.

It should be understood that in the context of the present application a digital media recording device or media recorder is any device operable to record audio and/or video in a digital format to a disk drive, flash memory, or any other recording medium. Examples of media recorders include a digital video recorder (DVR), an audio-only recorder, a digital camera, a personal digital assistant with recording capability, as well as any personal computer (PC), workstation, laptop or notebook computer, or other equipment configured for audible or visual recording.

A wireless access point (WAP or AP) is a device that connects wireless communication devices together for communication of information or to form a wireless network. A WAP may also connect with a wired network, in which case it can relay data between wireless devices and wired devices. Wireless communication between media recorders, and also between a WAP and a media recorder may be via any one of a variety of technologies and protocols, including Bluetooth™, IEEE 802.11, wireless application protocol, the proposed G3 wireless protocol, or other known or later-developed wireless technologies, data formats, and protocols.

It is appreciated that media may be recorded by a media recording device in accordance with any one of a number of known or future-developed recording formats and protocols. Additionally, tags or identifiers attached, embedded within, associated with, or incorporated within the recorded media, e.g., using techniques such as watermarking, may follow any definition, specification, or protocol standardized or proposed as a standard for use with media files and/or commercially-available media recorders. In the context of the present disclosure, to "attach" a tag or identifier to a digital media file broadly covers any known or future-developed technique for embedding or associating a tag or identifier into or with digital media file.

Referring to FIG. 1, an example event 10 with wireless communication and updating of tags for media files created by different digital recording devices. The dashed line 10 shown in FIG. 1 may represent the physical boundary or geographic coordinates that define the event. For instance, a group of individuals may gather for a wedding or other celebration at a restaurant, ballroom, outdoor garden, or other gathering place, with dashed line 10 representing the physical boundaries of the event location. Alternatively, the physical "size" of the event may be determined by the roaming range of the digital recording devices that tag their respective recorded media with a common identifier, as described in more detail below.

In the example of FIG. 1, three different media recorders are shown: a pair of digital cameras 12 & 16, and a digital video recorder (DVR) 11. At the beginning of the event, a user (John) may power-on digital camera 12 and push or select an 'event' button on his camera. The event button may comprise a physical button located on camera 12 or a soft button selectable via a screen of a graphical user interface (GUI). In another embodiment, the event functionality may be automatically invoked or loaded upon power-on of the device.

Once the event functionality has been invoked on digital camera 12, it enters a "publish/discovery" mode of operation, wherein camera 12 wirelessly transmits a ping or other message to wirelessly-enabled media recorders operating within a transmission range or specified proximity of camera 12. Digital camera 12 may remain in this mode until disabled by John. In the case where camera 12 does not discover any other media events presently active, it may begin to publish an event, assigning a unique identifier or tag (e.g., "ABCD") for embedding within all media files recorded at the event. All photos taken by camera 12 throughout the duration of event are encoded with this unique event tag.

Continuing with the example of FIG. 1, shortly after camera 12 begins publishing event 10 with tag ABCD, another attendee (Nick) powers-on her DVR 11 and starts recording video files. Being within close proximity to each other, camera 12 and DVR 11 detect each others' presence and wirelessly exchange information regarding the event. This exchange is shown in FIG. 1 by signals 14 & 15 associated with devices 11 & 12, respectively. By way of example, Nick may push an event button on DVR 11, which causes her recorder to detect or locate the ABCD event on camera 12. Camera 12 may automatically prompt Nick (via a GUI of DVR 11) whether or not she wishes to join the event. In other embodiments, DVR 11 may be configured to automatically join the event, adopting the pre-existing tag already in use. Alternatively, Nick may manually respond affirmatively to the join request. In either case, once DVR 11 has been included as part of the event, all of the video streams recorded throughout the event by DVR 11 are encoded with the same identifier or tag as John's photos, i.e., ABCD. Thereafter, DVR 11 enters publish/discovery mode so that any other digital recording devices within transmission range or a specified proximity of DVR 11 may be prompted to join the event in a similar manner as described above.

The example of FIG. 1 also shows camera 16 (associated with a user Ben) powering-on at a time $t=t_0$, which may be either before or after the time that camera 12 powered-on. In either case, at the time that camera 16 turns on, it is beyond the transmission range of either camera 12 or DVR 11. As such, camera 16 enters publish/discovery mode of operation similar to that described above for camera 12. Not finding any other wirelessly-enabled media recording devices within range, camera 16 starts encoding pictures captured at the event with its own uniquely assigned tag, e.g., "WXYZ". Later, at time $t=t_1$, Ben physically moves within wireless transmission range of DVR 11. Because camera 16 is still in publish/discovery mode, it detects the presence of DVR 11 and begins wirelessly exchanging information about the event, which information may include the time that media recording began, the tag used, the number of other devices known to be using the same tag.

A number of different decision rules may be applied by one or both devices to determine which device is to change or update the tags embedded into its recorded media files. For example, the rule may be to use the earliest tag, except in situations where the total number of other devices known to be using a different tag is greater. Applying this rule to the example of FIG. 1 would mean that even if camera 16 powered-on and began encoding photos with tag WXYZ before camera 12, camera 12 should change the tag of its media files for the event from WXYZ to ABCD due to the fact that camera 12 and DVR 11 have been using tag ABCD encoded into their media recordings. This is shown in FIG. 1, wherein camera 16 and DVR 11 communicate via wireless signals 19 & 18, respectively, with camera 16 changing/updating its event tag to ABCD.

Regardless of the particular decision rule utilized, over sufficient time, all wirelessly-enabled media recording devices present at the event may converge upon a single, commonly-used tag or identifier.

At a later date, John, Nick and Ben may publish their photos on the Internet on their respective websites that index the encoded event tag. Each person may then search for the others' event media files (e.g., photos & videos) through the search portal of their choice by using the unique event tag/identifier. In an alternative implementation, a dynamically-created website may "spider" the Web and import all event-relevant photos, where they may be accessed by any (or a selected number) of the event attendees. It is appreciated that certain events may be configured to have passwords or codes to ensure privacy both to join and to view the published media files.

It is further appreciated that the encoding of the media files may include GPS location information as part of the tag or identifier information, available from GPS enabled cameras, DVRs, camera-phones, etc. For instance, a globally unique identifier comprising GPS location, plus date, plus time may be embedded into the media files.

Figure 2:
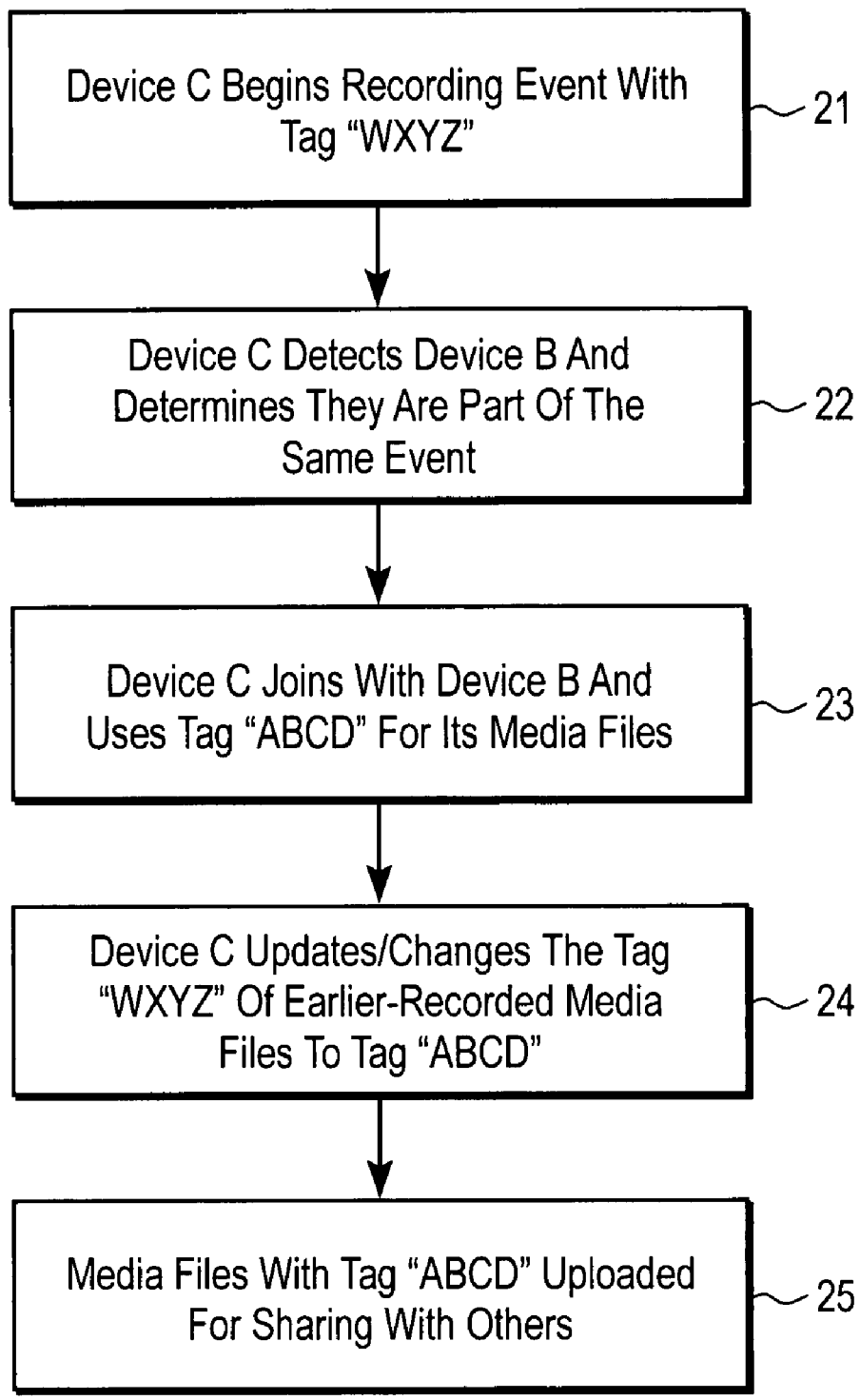
FIG. 2 illustrates an example method of operation for one of the digital recording devices shown in FIG. 1.

FIG. 2 illustrates an example method of operation for one of the digital recording devices shown in FIG. 1. The process begins with media recording Device "C" (e.g., camera 16) powering-on and beginning to record media files encoded with the unique tag WXYZ (block 21). Some time later, Device C detects another wirelessly-enabled device powered-on, Device "B", and determines that both are recording the same event (block 22). For example, this determination may involve a simple recognition of the fact that they are both recording media files in the same general timeframe and within the same physical proximity. Other events may be more strictly defined by GPS coordinates or by a participation password/code.

Once the two devices have determined that they are part of the same event (block 22), Device C joins the event with Device B and begins using Device B's tag ("ABCD") for all media filed recorded at the event (block 23). In addition, because Device C had already encoded a number of its earlier-recorded media files with the tag WXYZ, Device C also updates/changes these earlier-recorded media files to the new tag ABCD (block 24). Later, all of the media files encoded with the WXYZ tag may be uploaded to the Internet, or to some other common file-sharing media device, where they may be viewed and/or listened to by other participants or attendees of the event.

Practitioners in the art will understand that there are situations in which certain social events may occur inside the context of a larger social event. For example a birthday party may take in a private suite or booth at a football stadium. In this situation the person creating the birthday party event can decide whether or not to include their small private event as a sub-event of the larger football game event. If so, the media files recorded at the birthday party may be tagged with multiple event codes which can subsequently be searched for and found on the Internet as part of their private event (with optional password protection), or as part of the public football game event. On the other hand, if the smaller event is not designated as a sub-event, then the birthday party event remains entirely independent of the larger event. An easily navigable UI may be implemented on the recording devices of persons attempting to join one of a number of smaller events occurring at a large event.

In another embodiment, event organizers may create and publish the larger football game event through wireless base stations distributed around the stadium. In another alternative embodiment, digital media recording devices at the event may be configured to look for similarity in the event tags (e.g., timestamps, GPS coordinates, etc.). Once a predetermined matching or similarity threshold has been reached, a larger event is automatically created, with all previously independently tagged media files being re-tagged with a new identifier unique to the larger event. The new larger event may be tagged "on top of" one or more smaller events in a hierarchical manner; that is, the tag of the smaller event may be preserved, with the new larger event being appended into the media files.

Figure 3:
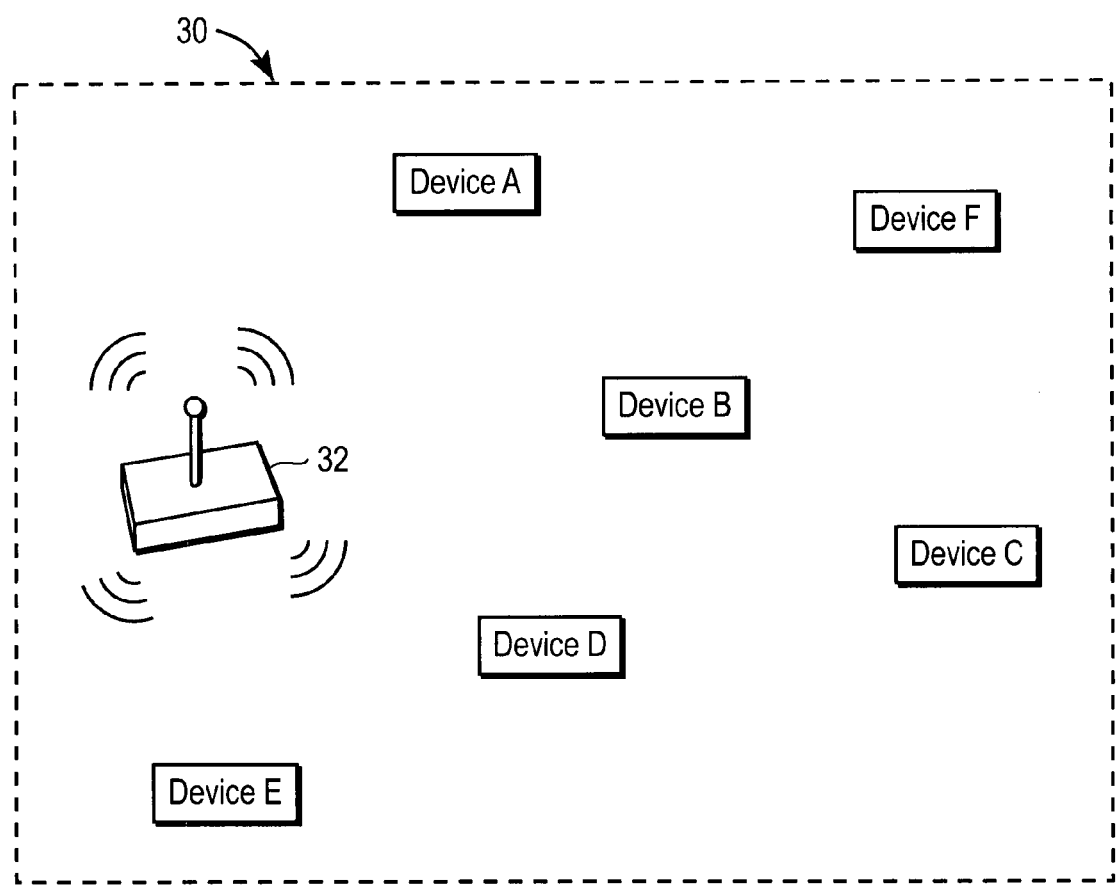
FIG. 3 illustrates another example configuration for wireless communication of tags created for digital recording devices at an event.

FIG. 3 illustrates another example configuration for wireless communication of tags created for digital recording devices at an event 30. In this embodiment, upon power-on, any wirelessly-enabled media recording device within transmission range of a nearby specially-configured media-sharing base station or media tagging-enabled wireless access point (WAP) 32 may register with WAP 32 to join or participate in the event. By way of example, six different media recording devices (i.e., Devices A-F) are shown within transmission range of WAP 32 at event 30. Once the first media device (e.g., Device A) registers the event with WAP 32, WAP 32 then takes on the duty of broadcasting event information, including the event tag, to all devices that subsequently power-on (e.g., Devices B-F). Following initial registration, WAP 32 may send a message to the originating media device, notifying that device to switch off its publish mode, thereby preserving battery power of the digital recording devices (they no longer have to continuously ping).

Alternatively, an event organizer may configure the WAP or base station such that each media recorder that powers on during the event is automatically provided with an event tag to be embedded into all media files recorded during the event. In other words, any one of a number of different wireless technologies (e.g., 802.11) may be used to beacon the event name to all recording devices physically present at the event.

Figure 4:
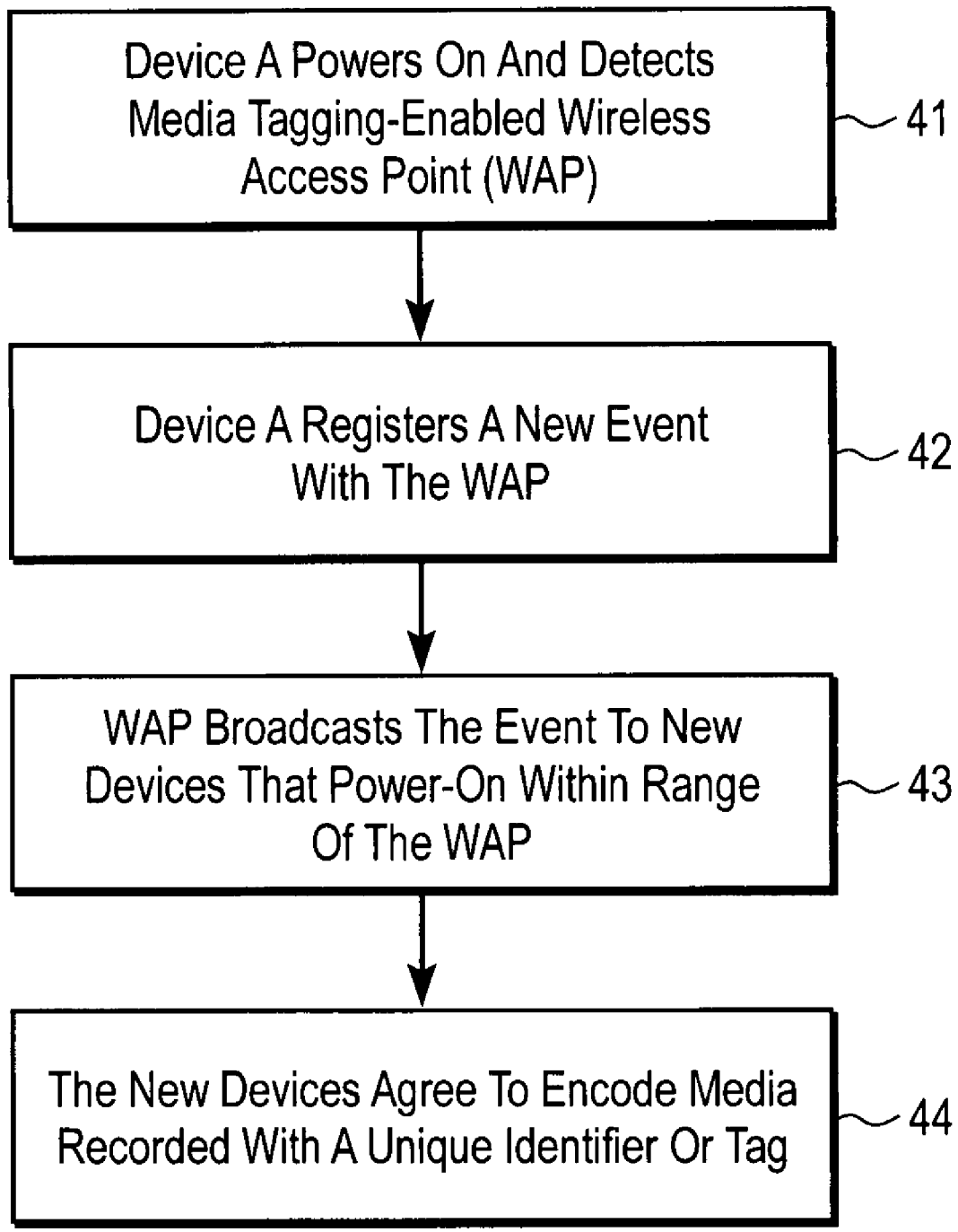
FIG. 4 illustrates an example method of operation for the configuration shown in FIG. 3.

FIG. 4 illustrates an example method of operation for the configuration shown in FIG. 3. The process begins at block 41 with Device A powering-on and detecting a WAP with media tagging capabilities within wireless transmission range. The user of Device A may be altered to the presence of WAP through an audible tone, electronically-generated voice prompt, visual alert, or any combination thereof. Using a UI on the media recorder, the user may manually register the event with the WAP (block 42). Alternatively, Device A may be pre-configured to automatically register the event with any media tagging WAP detected upon power-on.

Following the initial registration process between Device A and the WAP, the WAP may begin automatically broadcasting or communicating the event tag to all media recorders within transmission range that subsequently power-on (block 43). Should they wish to join the event for media file-sharing purposes, each of the newly powered-on devices agree to encode media recorded during the event with the unique identifier or tag communicated to them via the WAP (block 44).

Figure 5:
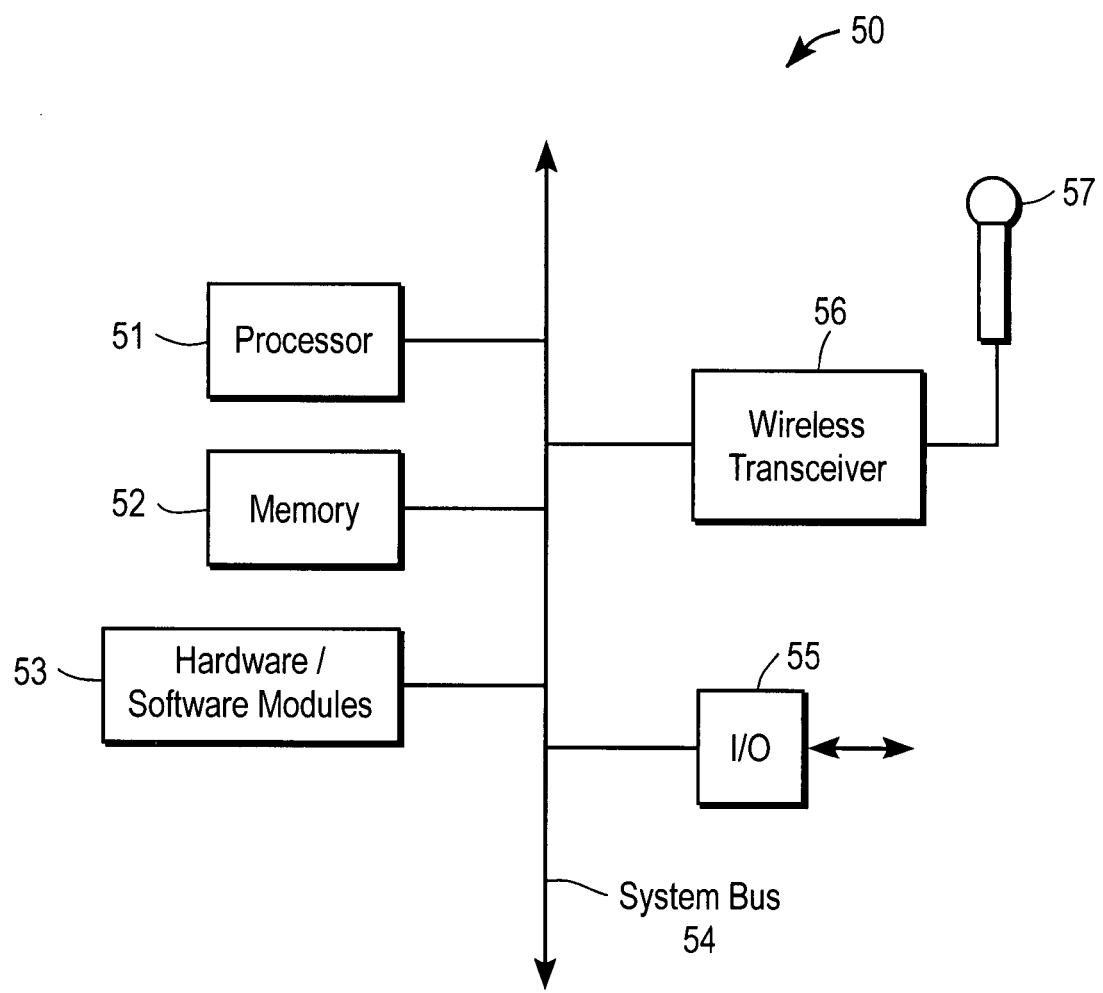
FIG. 5 illustrates an example architecture of a digital recording device that incorporates a wireless transceiver.

FIG. 5 illustrates an example architecture of a media recording device (or node) 50, such as may comprise any of the media recording devices or nodes (e.g., a WAP or wireless base station) shown or described above. Device 50 includes a processor subsystem 51 coupled with a memory 52, one or more hardware/software (or firmware) modules 53, and an input/output (I/O) interface 55 via a system bus 54. I/O interface 55 may include hardware/software components implementing a user interface (UI) for input of commands, data, and selection of various modes of device operation. Modules 50 may include software, firmware, or logic embedded in hardware for implementing any of the functions described herein, e.g., those functions associated with wireless communications, registering an event, exchanging, updating, or changing media tags, etc.

Also coupled to systems bus 54 is a wireless transceiver 56 coupled with an associated antenna 57. Device 50 may also include microphone and video camera components (not shown) coupled to processor 51. Processor 51 is operable to communicate with other media recorders or a WAP, base station, etc., via wireless transceiver 56. Additionally, during communications with another device, processor 51 may execute code that runs a protocol for tagging media files with a commonly used tag or unique identifier assigned or adopted (e.g., ad hoc) for a specific event. Hardware, software and/or firmware modules 53 coupled with processor 51 may include software (or firmware) for detecting other wirelessly-enabled media recorders. Additionally, modules 53 may include executable code for encoding and/or changing media file identifiers so that all recording devices detected at the event converge upon a single common media tag that uniquely identifies the event.

Additionally, processor subsystem 51 may run software (or firmware) specifically aimed at registering an event with the nearest media tagging-enabled wireless access point or media-sharing base station. For instance, a registration procedure may be automatically executed upon power-on of the device. Following registration, the device may turn off its "publish" mode of operation obviating the need to continuously communicate (e.g., "ping") with other devices.

It is appreciated that any wirelessly-enabled device which comprises the elements shown in FIG. 5, and which is utilized in conjunction with automatic identification of digital media from a given event may also comprise separate hardware devices coupled to the system bus 54, or, alternatively, implemented as software programs or modules 53 that run on one or more processors of subsystem 51. In other words, the identification, registration, communication, sending an/or changing of tag information, storing, and receiving of media content, as well as other associated functions may be implemented as separate hardware devices, memory locations (storing executable code), firmware devices, software modules, or other machine-readable devices. (In the context of the present application, therefore, the term "module" is to be understood as being synonymous with both hardware devices and computer-executable software code, programs or routines.)

It should be further understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A method comprising:
    attaching a unique event tag to one or more media files recorded at an event by a first device, the first device comprising a digital image recording device;
    wirelessly discovering, by the first device, a second device at the event;
    wirelessly communicating the unique event tag to the second device for attaching to one or more media files recorded at the event by the second device; and
    applying one or more decision rules to the first and second devices to change the unique event tag at the event responsive to a third device being wirelessly discovered at the event by either the first or second device.

2. A method comprising:
    wirelessly receiving, by a first device, a request to join an event, the request being transmitted by a second device, the first and second devices each comprising a digital image recording device;
    accepting, by the first device, the request to join the event;
    wirelessly receiving, by the first device, a tag identifying the event transmitted by the second media recording device;
    attaching the tag to one or more media files recorded at the event by the first device; and
    applying one or more decision rules to the first and second devices to change the tag to a new tag at the event responsive to a third device being wirelessly discovered at the event by either the first or second device.

3. The method of claim 2 wherein the tag comprises a time and date of the event.

4. The method of claim 3 wherein the tag further comprises global position coordinates of the event.

5. The method of claim 2 wherein the tag and the new tag are associated with respective first and second timestamps, the tag being changed to the new tag in accordance with a predetermined criteria based upon a difference between the first and second timestamps.

6. The method of claim 2 wherein accepting the request to join the event comprises sending a password associated with the event to the second device.

7. An apparatus comprising:
    a media capture device;
    a wireless transceiver;
    one or more processors coupled to the wireless transceiver and to the media capture device; and
    a memory comprising one or more instructions executable at the processors, the one or more processors being operable, when executing the instructions, to:
        store data captured at an event by the media capture device into one or more media files in the memory;
        receive, via the wireless transceiver, a request to join the event, the request being transmitted by a first device;
        accept the request to join the event;
        receive, from the first device, a tag uniquely identifying the event;
        attach the tag to the one or more media files recorded at the event: and
    wherein the one or more processors are further operable, when executing the instructions, to change the tact attached to the one or more media files recorded at the event to a new tag responsive to communications with another wireless device present at the event.

8. The apparatus of claim 7 wherein the media capture device comprises an audio/video (A/V) recording device.

9. The apparatus of claim 7 wherein the first device comprises a wireless access point.

10. The apparatus of claim 7 wherein the first device comprises a wirelessly-enabled digital camera or digital video recorder.

11. A method comprising:
    wirelessly detecting, by a recording device, a wireless access point (WAP) having media tagging capabilities;
    wirelessly registering, by the recording device, a first event with the WAP, in response, the WAP broadcasting a tag assigned to the first event to wirelessly-enabled media recording devices within a transmission range of the WAP;
    tagging, by the recording device, one or more media files recorded at the first event by the recording device with a identifier unique to the first event, the identifier including a time and date of the first event;
    re-tagging the one of more media files with a new identifier unique to a second event, the second event encompassing a larger geographical area than the first event.

12. The method of claim 11 wherein the identifier and the new identifier each include global positioning coordinates.

13. The method of claim 11 further comprising receiving a message sent from the WAP notifying the recording device to switch off a publish mode of operation.

* * * * *